United States Patent [19]

Robbins et al.

[11] Patent Number: 5,729,748
[45] Date of Patent: Mar. 17, 1998

[54] CALL TEMPLATE BUILDER AND METHOD

[75] Inventors: Jeffrey C. Robbins; David G. Bradlee, both of Seattle; Timothy L. Paterson, Redmond, all of Wash.

[73] Assignee: Microsoft Corporation, Redmond, Wash.

[21] Appl. No.: 417,066

[22] Filed: Apr. 3, 1995

[51] Int. Cl.$^6$ .................................................. G06F 9/445
[52] U.S. Cl. ............................................ 395/705; 395/712
[58] Field of Search ........................... 370/85.13, 97, 370/84; 364/514 C, 230, 231.8, 231.9, 262.4, 931, 931.01, 931.4, 931.44, 221.7, 232.22, 266, 267.4, 280; 395/375, 702, 703, 704, 705, 707, 709, 712, 200.3, 200.6, 200.57, 200.67, 200.68, 680, 682, 285, 650, 700; 371/42, 37.1, 46, 47.1

[56] References Cited

U.S. PATENT DOCUMENTS 5,136,705  8/1992  Stubbs et al. .................... 395/183.03
5,430,850  7/1995  Papadopoulos et al. ............... 395/375

OTHER PUBLICATIONS

Microsoft, Technical Note 39: MFC/OLE Automation Implementation, Visual C++ V. 1.5 Help, MFC Technical Note 39 (1993).

Brockschmidt, Kraig, Inside OLE (Second Edition), pp. 638–675, Microsoft Press (1995).

*Primary Examiner*—Dang Ton
*Attorney, Agent, or Firm*—Klarquist Sparkman Campbell Leigh & Whinston, LLP

[57] ABSTRACT

A call template builder constructs call templates for interfacing between two blocks of code that utilize different calling conventions. Each call template is built to perform calling convention translation for a call from a source code block to a particular function in a target code block. The call template is formed as a linear block of code having computer code instructions for moving each argument of the function call between locations in memory and registers of the computer complying with a calling convention of the source code block to locations complying with a calling convention of the target code block. Call templates can be constructed for any arbitrary calling convention by providing a definition to the call template builder of the calling convention indicative of the locations for passing arguments and transferring control to the function in compliance with that calling convention.

15 Claims, 16 Drawing Sheets

CALL TEMPLATE BUILDER AND METHOD

FIELD OF THE INVENTION

This invention relates generally to function and procedure calling in computer systems, and more particularly relates to interfacing between two blocks of computer program code that utilize different calling conventions.

BACKGROUND OF THE INVENTION

Computer programs typically include one or more functions, procedures, and like program units (hereinafter all referred to as "functions" for expository convenience). Each function generally comprises a block of code that implements a particular operation or functionality on a set of values referred to as "parameters" or "arguments," and which may return a value. In each place in the program that the operation or functionality is to be performed, a "call" is made to the function. The "call" passes values as arguments to the function, and transfers "control" (i.e. use of processing resources) to the function. After the function is completed, control returns to the point in the program following the call, and any resulting value is returned.

The manner in which a function call is made typically varies between different computer systems, and different programming language systems. Microsoft Corporation's Visual Basic for Applications ("VBA") programming language system, for example, utilizes a particular internal calling convention when making calls to Basic programming language functions. On the other hand, hardware vendors typically establish one or more calling conventions applicable to programs compiled for a particular hardware platform. For example, a particular calling convention has been established which is applicable to programs compiled for computers systems based on the Intel 80×86 family of microprocessors. Vendors of other computer system hardware platforms have established quite different calling conventions which are applicable to programs compiled for their computer systems. Each of these calling conventions has it's own very specific rules for making function calls, passing arguments, and returning values.

When programs are compiled or otherwise built to an executable state, they are typically built to make and receive function calls in conformance with a single calling convention. For example, compilers which build programs to run on computer systems based on Intel microprocessors typically build the programs to make function calls conforming to the calling convention established for that computing platform. The compiler further builds the program to receive function calls in conformance with that same calling convention.

A problem arises, however, when program code built to make function calls conforming to one calling convention is to call a function in other program code which is built in conformance with a different calling convention. In such case, the two code blocks will generally have different requirements for passing of arguments, transferal of control, and return of any return value of the function. Without some means of translating the function call between the competing conventions, the function call cannot be made without causing serious error. For example, the VBA programming language system builds program code to utilize its internal calling convention (which differs from that of the hardware platform on which it is run) when calling other Visual Basic functions. However, it is sometimes desirable to call functions provided in function libraries (e.g. dynamic link libraries ("DLLs") and the like) and other programs which are compiled to conform to the calling convention of the hardware platform on which the programs are run. As long as control stays within VBA, no translation is needed. However, when the user's Basic code calls an external function (or vice versa), translation between the VBA internal format and the target external format is needed.

Further, in recent years, there have been many new computer chips introduced into the market (e.g. Intel 80386 and later compatible chips, Motorola 68000 series, ALPHA, MIPS, PowerPC, etc.). Each of these, in turn, has one or more unique calling conventions which VBA must interface with. A translation mechanism therefore is needed that is easily and quickly adaptable to target calling conventions of new hardware platforms.

Prior art attempts to bridge arbitrary calling conventions generally have involved an interpretive approach in which the translation process takes place at run-time, and is repeated each time the function is called. Typically, a run-time function including a decision loop evaluates where each argument is to be moved between source and target calling convention locations, how to make the call, and how to package the return value.

One example of interpretive calling convention translation is the dispatch interface provided in Microsoft Corporation's Object Linking and Embedding ("OLE") system, which utilizes the run-time function "IDispatch::Invoke( )." Any calling code which makes a function call utilizing the IDispatch::Invoke( ) function must first package the arguments of the function call in a data structure which is an array of "VARIANTs." (Each VARIANT is a data structure containing a value and a data type tag.) The code then sets various flags, and calls the IDispatch::Invoke( ) function. When the IDispatch::Invoke( ) function gets control, it loops through the VARIANT parameter array coercing arguments into the appropriate hardware locations, makes the call on the caller's behalf, encodes any return value in a VARIANT structure, and returns to the caller. On return from the IDispatch::Invoke( ) function, the calling code retrieves any return value of the function from the return VARIANT.

The OLE dispatch interface approach to calling convention translation has several drawbacks. First, the IDispatch::Invoke( ) function does not actually translate from any arbitrary source calling convention. Rather, it requires the calling code to package arguments and return values according to yet another convention, i.e., as an array of VARIANTS. Accordingly, the calling code must itself be built to utilize the OLE dispatch interface's VARIANT packaging convention rather than the calling code's internal calling convention. Second, the amount of overhead involved in packaging up arguments as VARIANTs and looping through them one at a time during program execution is very expensive in processing time (i.e., slow). Further, although the OLE dispatch interface can be ported (i.e. adapted) to work on various hardware platforms, its implementation in each case is specific to the hardware platform on which it runs.

Accordingly, one objective of this invention is to interface between two blocks of code with different calling conventions.

Another objective is to provide such calling convention translation with fast, efficient execution-time performance.

A further objective is to provide a flexible and portable call translation scheme that can quickly be targeted to new calling conventions.

SUMMARY OF THE INVENTION

The present invention creates a fast, linear block of computer code referred to herein as a call template. The call template performs a calling convention translation from a source to a target calling convention for a particular function in a non-interpretive manner. The call template is built once for a function based on a function prototype defining the number and data types of any arguments and return value of the function. The call template can then be employed each time the function is called using the particular source calling convention. Since the call template is a linear code block that translates from the source calling convention itself, no pre-packaging of arguments and return values is performed. Further, the call template performs the translation without run-time looping over arguments. Accordingly, the call templates achieve fast and efficient execution-time performance.

According to a further aspect of a preferred embodiment of the invention, the call template is built based on descriptions of the source and target calling conventions consisting of a set of interface constants. In some embodiments of the invention, the calling convention descriptions also can include some conditional computer code. The interface constants describe, for example, which and how many processor registers are utilized for passing of arguments. The interface constants can be easily and quickly changed to reflect the selection of registers used for argument and return value passing and other characteristics of many different calling conventions. A call template builder according to the preferred embodiment therefore is flexibly adaptable to the calling conventions of new hardware platforms by simply modifying these interface constants.

According to yet another aspect of the preferred embodiment, the call template builder assembles selected code fragments from a collection of code fragments to form the call template. The code fragment collection is specific to a particular computing platform on which the call template is to be run. The call template builder of the preferred embodiment can be flexibly adapted to new computing platforms (e.g. MIPS, ALPHA, Intel 80x86, etc.) by providing the call template builder with a collection of code fragments particular to the next computing platform.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
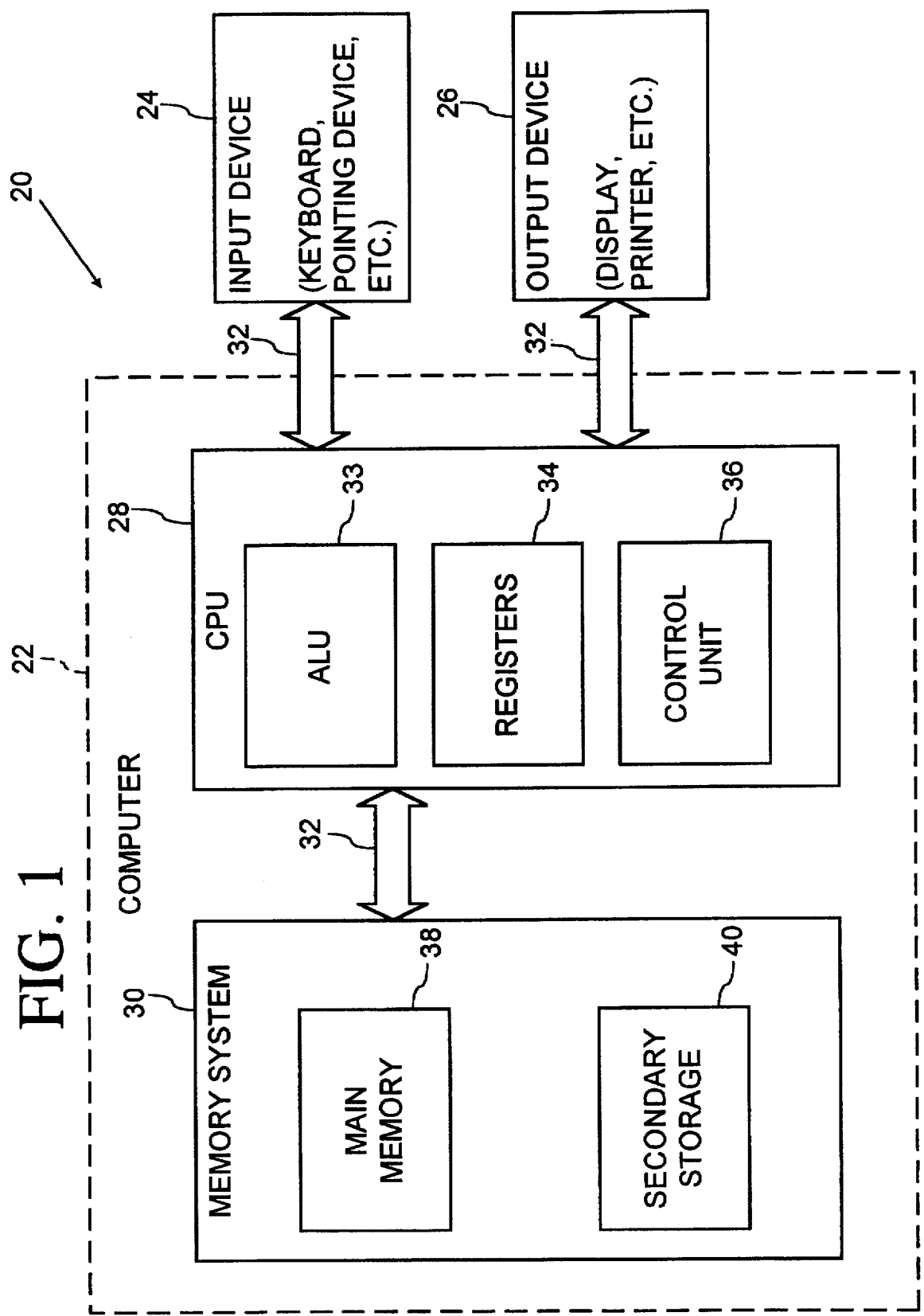
FIG. 1 is a block diagram of a computer system that may be used to implement a call template builder and method embodying the invention.

FIG. 1 is a block diagram of a computer system 20 which is used to implement a method and apparatus embodying the invention. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
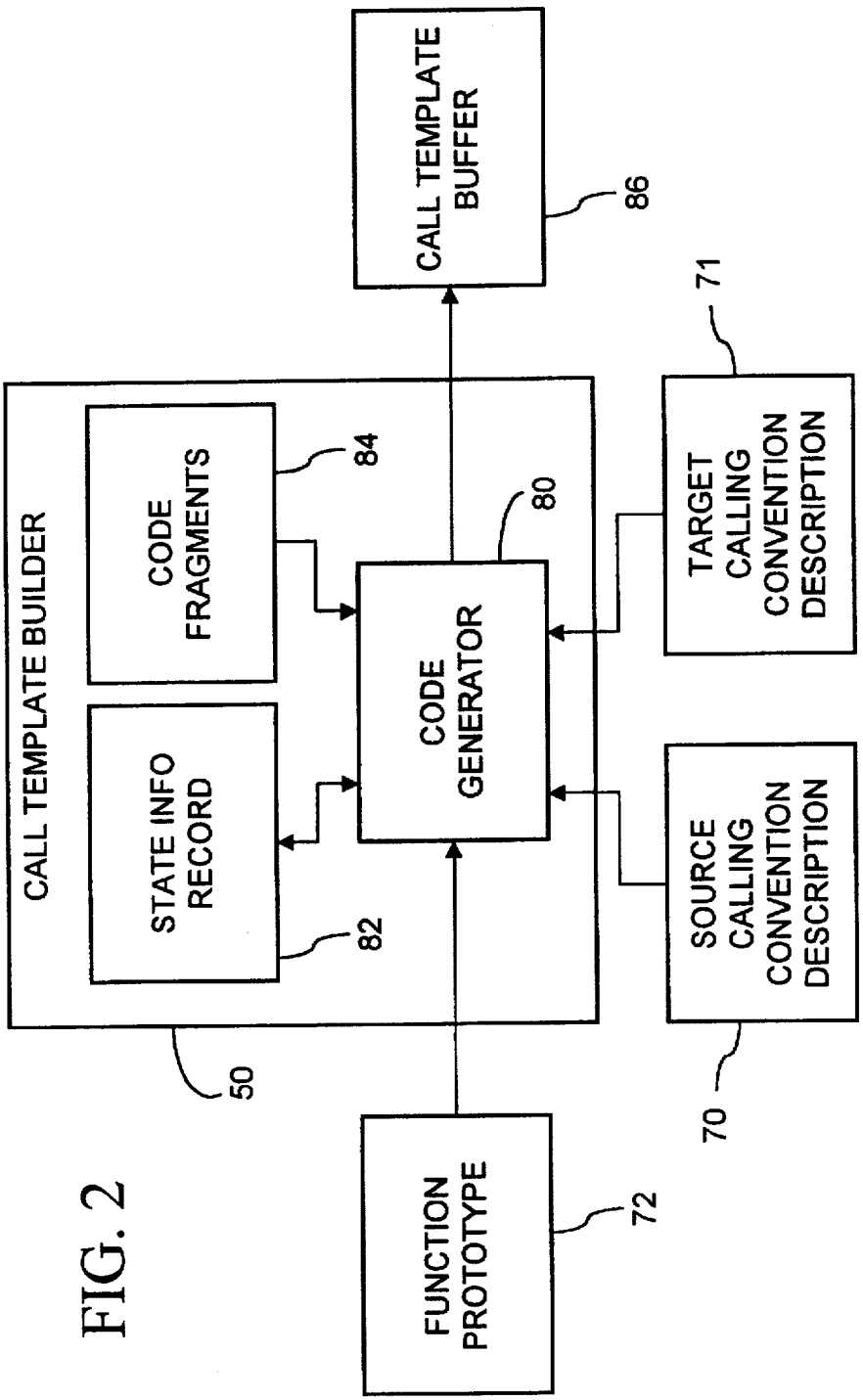
FIG. 2 is a block diagram of a call template builder which generates a call template according to a preferred embodiment of the invention.
Figure 3:
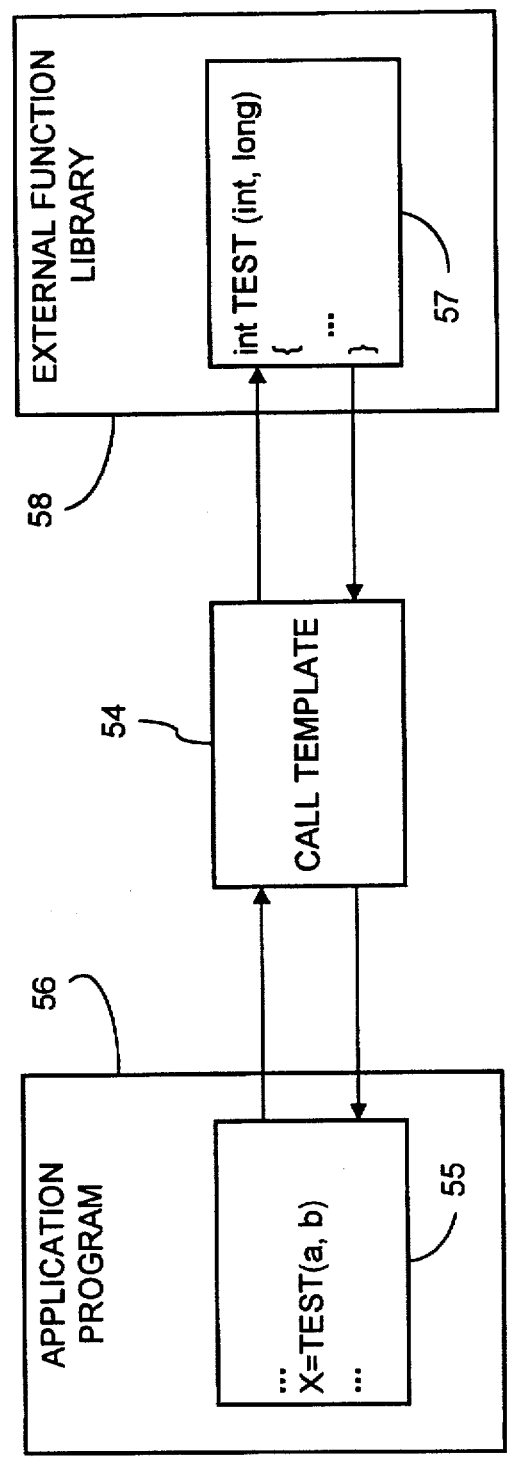
FIG. 3 is a block diagram of an exemplary call template generated by the call template builder of FIG. 2 for translating calls of an application program to a function provided in an external function library.

With reference to FIGS. 2 and 3, a call template builder 50 (FIG. 2) according to a preferred embodiment of the invention generates call templates, such as an exemplary call template 54 (FIG. 3), for interfacing between two blocks of code that utilize different calling conventions. Call template 54, for example, is generated by call template builder 50 to perform calling convention translation for a call 55 in an application program 56 to a function "test( )" 57 provided in an external function library 58. (The calling code block, e.g. application program 56, is herein referred to as the "client program," while the code block, e.g. external function library 58, which provides the function being called is herein referred to as the "server program.") Call template 54 is built by call template builder 50 as a linear block of code, preferably prior to running client application program 56. At the run time of application program 56, any calls including call 55 to test function 57 are made by client application program 56 through call template 54 using its internal calling convention. Call template 54 operates to re-arrange any arguments of the client application program's call 55 to conform to the calling convention of external function library 58, then transfers control to test function 57 again in conformance with the external calling convention. When test function 57 completes, call template 54 relocates any return value to conform to the internal calling convention of application program 56, and returns control back to client application program 56. Accordingly, through use of call template 54, client application program 56 is able call test function 57 with its internal calling convention, while the server program, external function library 58, receives the call as though made with its external calling convention. For example, the calling conventions of client application program 56 and external function library 58 may be the VBA calling convention and the MIPS calling convention, respectively, which are described in more detail below. The call template 54, however, can be built to interface between any two arbitrary calling conventions.

The calling conventions of client application program 56 and external function library 58 provide a number of rules which generally govern how arguments are passed, how control is transferred, and how any return value is passed back. More specifically, a calling convention details what number of various data types (integer, floating point, etc.) of arguments are to be passed in processor registers 34 (FIG. 1), and which arguments are passed on a machine stack ("MS") provided in memory 38 (FIG. 1) of the computer system. The calling convention further details how structures are passed, and how much frame space (e.g., argument "homing" area, etc.) is required. The calling convention further determines the sequence of instructions in computer code that are required to transfer control to the targeted function, and how any return value is passed back.

As an example, a calling convention applicable to computer systems based on the MIPS computer chip includes, among others, the following rules: (1) integer short and long arguments may be passed in integer registers R4, R5, R6, and R7; (2) floating-point arguments may be passed in registers FP12, FP13, FP14, and FP15; (3) single precision floating-point arguments use one floating point register; (4) double precision floating-point arguments use two sequential floating-point registers, and must start in even register boundary (i.e., FP12/FP13 and FP14/FP15 are ok but not in FP13/FP14).; (5) integer and floating-point registers are "paired" such that if you use an FP register, the corresponding integer register is skipped (i.e., if you use FP12 for an argument, R4 is also consider "used"), but using integer registers does not require floating point register to be skipped; (6) arguments that don't fit into the registers are passed on the machine stack; (7) the stack contains an argument "homing" area (an area of 16 bytes in a specific place where the callee may "spill" the register arguments as needed). All processor registers 34 on present MIPS computer systems are 32-bit registers.

Figure 7:
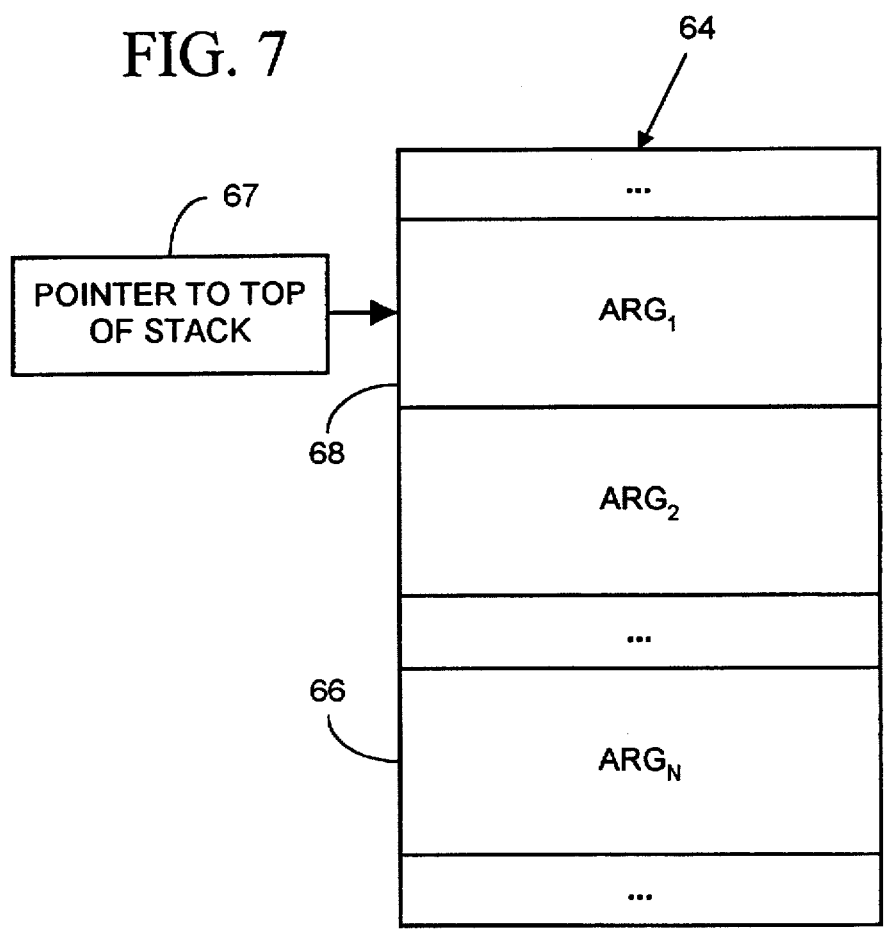
FIG. 7 is a block diagram of a virtual stack employed in function calls according to a calling convention of the VBA programming language system.

With reference to FIG. 7, the VBA programming language system, on the other hand, utilizes a calling convention with much simpler rules for argument passing. Arguments for a function call are simply pushed onto an internal buffer referred to as a virtual stack ("VS") 64 in reverse order. Accordingly, the bottom-most argument in a call is the function's last argument ("Arg$_N$") 66. While the argument indicated by a pointer 67 to a top of VS 64 is the function's first argument ("Arg$_1$") 68.

With reference again to FIG. 2, call template builder 50 generates call templates based on descriptions of a source calling convention 70 and a target calling convention 71, as well as a function prototype 72. The source calling convention is that of the client program or code block which makes the function call, while the target calling convention is the calling convention of the server program or code block which supplies the function being called. In the case illustrated in FIG. 3 for example, where application program 56 utilizes the VBA programming language system's internal calling convention employing a virtual stack 64 (FIG. 7) and external function library 58 is compiled for a MIPS based computer system, call template builder is provided with a description of VBA's internal calling convention as source calling convention description 70, and a description of the MIPS calling convention as target calling convention description 71.

In the preferred embodiment of the invention, source and target calling convention descriptions 70–71 each take the form of a set of interface constants, which contain information representing the rules of the calling convention as shown in the following Table 1.

TABLE 1

Interface Constants

| Constant Name | Information Represented |
| --- | --- |
| IREG0 | 1st integer argument register |
| IREGMAX | Last integer argument register |
| IREGSIZE | Integer register size (in bytes) |
| FREG0 | 1st floating-point argument register |
| FREGMAX | Last floating-point argument register |
| FREGSIZE | Floating-point register size |
| MSARGALIGN | Machine Stack (MS) argument alignment (in bytes) |
| VSARGALIGN | Virtual Stack (VS) argument alignment (in bytes) |
| MSHOMEARGSIZE | Machine Stack (MS) argument homing area size (in bytes) |
| MSSTACKALIGN | Machine Stack (MS) frame alignment (in bytes) |

Since calling conventions are generally static for a particular computer system and programming language system, the interface constants which form source and target calling convention descriptions 70–71 can be compiled into a particular implementation of call template builder 50 intended for use with a particular hardware platform. For example, interface constants defining the MIPS calling convention discussed above for a call template builder used with MIPS based computer systems can be #define constants (in the C programming language) which are built into that particular call template builder during its compilation, such as the following:

```
#define IREG0      4
    // first integer arg register
#define IREGMAX    7
    // last integer arg register
#define IREGSIZE   4
    // byte size of each int register
#define FREG0      12    // 1st fp arg register
#define FREGMAX    15    // last fp arg register
#define FREGSIZE   4
    // byte size of each fp register
#define MSARGALIGN      4
    // arg stack alignment (in bytes)
#define MSSTACKALIGN    8
    // frame alignment (in bytes)
```

```
#define MSHOMEARGSIZE    16
        // Argument homing area size (in bytes)
```

Although most all calling convention rules can be described by interface constants such as the above, source and target calling convention descriptions 70–71 also may be implemented with some conditional statements, which may be in the C programming language (or other programming language in which call template builder is implemented). Further in applications where the same implementation of call template builder 50 is to create call templates for several source and/or target calling conventions, source and target calling convention descriptions 70–71 can be in the form of variable values input to call template builder 50 each time a call template is formed.

Call template builder 50 can be easily and quickly adapted to new calling conventions by simply modifying the interface constants (i.e. editing the #define statements) to reflect the rules of the new calling convention, then re-compiling call template builder 50. Generally, the same information must be represented in each of the various hardware vendor's calling conventions. Accordingly, the names of the interface constants (e.g. IREG0, IREGMAX, etc.) are common across all calling conventions. Only the values associated with each of the constant names in the #define statements need to be changed when adapting call template builder 50 to a new calling convention. This allows code for call template builder 50 to be a common driver that produces different templates based on the particular convention definition provided to it. Call template builder 50 has proved to be quickly (such as within two weeks of a developer's time) portable to new computer system hardware platforms.

Function prototype 72, on the other hand, contains information relating to a particular function which is to be interfaced by a call template. In the preferred embodiment of the invention, each call template interfaces to only one function. Accordingly, a different function prototype 72 is input to call template builder for each call template that is built. Function prototype 72, in the preferred embodiment, is a record data structure containing the information shown in the following Table 2.

TABLE 2

Function Prototype Record Information

Address (or ID) of target function
Data type of function return value
Number of arguments
Data type of $arg_1$
Data type of $arg_2$
...
Data type of $arg_N$ Function prototype records generally are provided by the compiler or language system of the client program for each external function which is to be interfaced with a call template. In the case of application program 56 (FIG. 3) for example, the function prototypes may be provided to call template builder by the VBA programming language system. The function prototypes can be formed by such compilers and programming language systems from a declaration statement of the data types of the external function in the source code of the client program, such as the following:

```
' declare an external procedure Test( )
Declare Function Test Lib "TESTDLL" (i as integer,
    1 as long) as integer
' Calls Test with two arguments
Function Main
    Dim X as integer
    X = Test(5, 10)
End Function
```

When such statements are encountered during compiling of the client program, the VBA programming language system determines that a call template is needed. The VBA programming language system then forms the function prototype 72 for the function which is to be called by the template, and calls call template builder 50 with that prototype. In the preferred embodiment, the form of the prototype is as follows (in C programming language):

```
typedef unsigned short DATA_TYPE;
struct PROTOTYPE {
    BYTE cParams;           // number of parameters
    DATA_TYPE dtReturn;     // function return value
                            // (DT_NULL means void)
    DATA_TYPE dtParam;      // first in array of params
    // ...
};
// enumeration for data types
enum DATA_TYPE_ENUM
{
    DT_UI1,                 // 0  unsigned 1-byte
                            // integer (byte)
    DT_I2,                  // 1  signed 2-byte integer (short)
    DT_I4,                  // 2  signed 4-byte integer (long)
    DT_R4,                  // 3  4-byte single precision
                            // floating point value (real4)
    DT_R8,                  // 4  8-byte double precision
                            // floating point value (real8)
    DT_CY,                  // 5  currency value
    // ...                  // ... additional data types ...
    DT_NULL                 // VOID
};
```

With reference still to FIG. 2, call template builder 50 comprises a code generator 80, a state information record 82, and a plurality of code fragments 84. Code generator 80 utilizes information in state information record 82 along with the interface constants of source and target calling convention descriptions 70–71 to represent the source and target calling conventions as state machines. A state machine is a series of states and actions that cause transitions between states. This state machine representation is useful in tracking the allocation of registers and machine stack locations for passing arguments according to the particular calling conventions involved. In a typical calling convention, such as the MIPS platform calling convention discussed above, a small number of function arguments are required to be passed in registers. Remaining arguments are passed on the machine stack. Accordingly, in the state machine calling convention representation, the interface constants of source and target calling convention descriptions 70–71 define, for example, which registers and how many registers are used to pass arguments according to these calling conventions. State information record 82 tracks how many registers are left for passing arguments for call template builder 50 as the call template is being built. The information contained in state information record 82 is shown in the following Table 3.

TABLE 3

State Information Record Contents.

Next integer argument register (−1 if none)
Next floating-point argument register
 (−1 if none)
Next MS stack location memory offset
Next VS stack location memory offset
Pointer to current location in template
Pointer to prolog fragment fixup location
Pointer to call fragment fixup location
Pointer to epilog fragment fixup location The output produced by call template builder 50 for each input function prototype 72 is a call template (e.g. call template 54 (FIG. 3)). Call template builder 50 builds each call template by copying selected code fragments from a collection of code fragments 84 into a template buffer 86, then altering them according to calling convention descriptions 70–71 and prototype 72 by pasting specific references to memory and processor locations into the selectively copied code fragments. The code fragments of collection 84 are specific to the computer system hardware platform on which the call template is to be run. Code fragment collection 84 preferably is created by the programmer who targets the template builder to a new computer system hardware platform. Code fragments of collection 84 can be created, for example, by writing data structure statements which define the various bitfields that form the code fragments. Code fragment collection 84 created for the MIPS calling convention discussed above may include the two code fragments shown in the following Table 4 (expressed in assembly language):

TABLE 4

MIPS Assembler Fragments.

| Name | Code Fragment | Comment |
| --- | --- | --- |
| VsToRegI2 | lh v0, 0(s0) | loads half-word (16-bits) from memory location 0(s0) to reg v0 |
| VsToRegI4 | lw v0, 0(s0) | load word (32-bits) from memory location 0(s0) to reg v0 |

The two code fragments VsToRegI2 and VsToRegI4 shown in Table 4 can be created with data structure statements such as the following (in the C programming language):

```
typedef unsigned int BITFIELD;
typedef struct {
        // lh v0, 0(s0)
    BITFIELD vsoffset: 16;
        // PATCHED: vs offset
    BITFIELD reg:5;
        // PATCHED: dest register
    BITFIELD _reg2:5;
        // register (source/base)
    BITFIELD _opcode:6;
        // opcode
}
VS_TO_REG_I2;
typedef struct {
        // lw v0, 0(s0)
    BITFIELD vsoffset:16;
        // PATCHED: vs offset
    BITFIELD reg:5;
        // PATCHED: dest register
    BITFIELD _reg2:5;
        // register (source/base)
    BITFIELD _opcode:6;
        // opcode
}
VS_TO_REG_I4;
```

(The bitfield names beginning with the underscore character "_" indicate parts of the code fragment that are not patched with a reference to a memory or processor register location. Generally, the names of the code fragment structures and of the patched offsets can be the same for each computer system hardware platform, although the structure definitions are different for each platform. Further, some code fragment structures may comprise more than one computer code instruction.)

Figure 6:
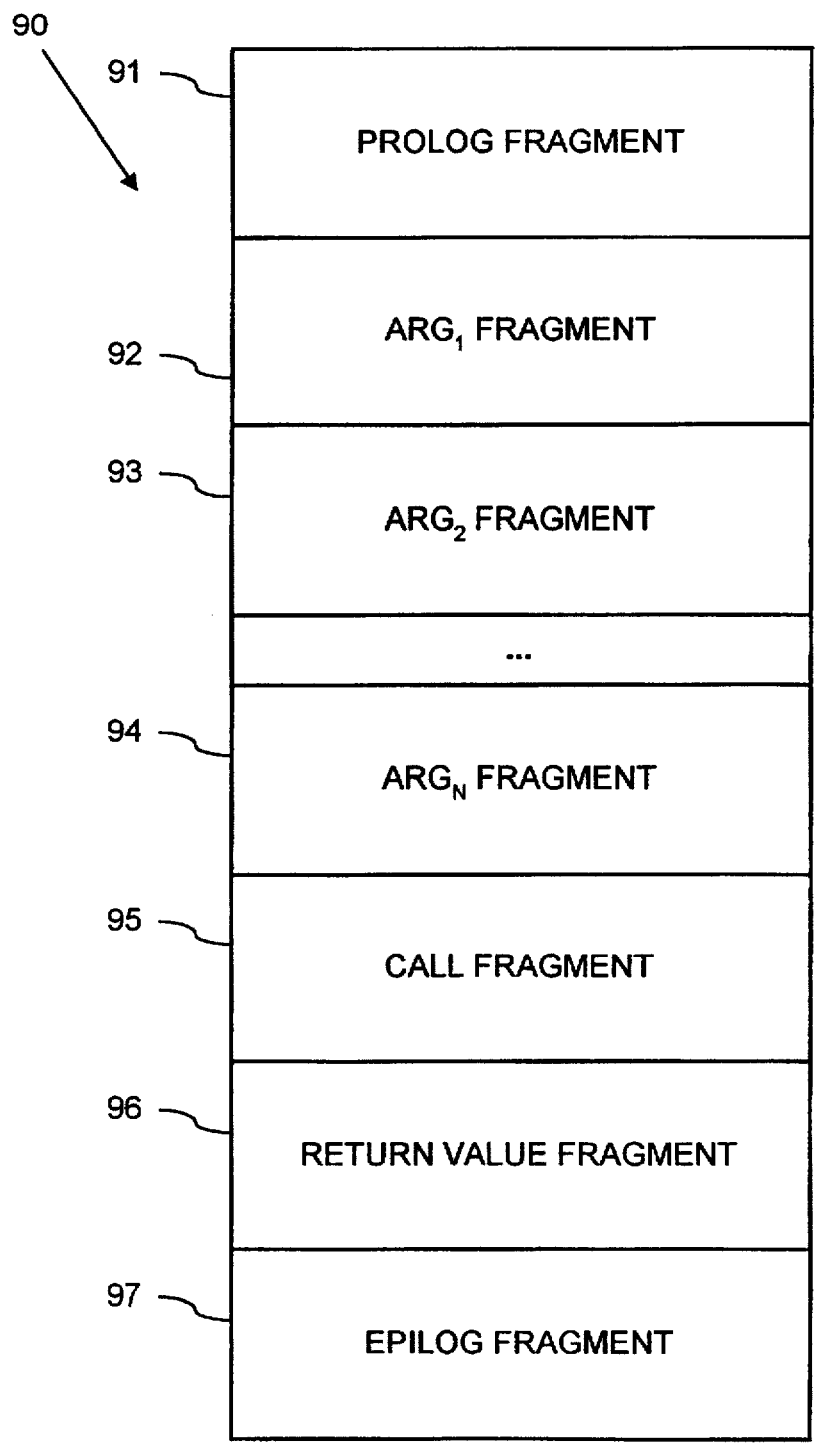
FIG. 6 is a block diagram of a layout of call templates generated by the call template builder of FIG. 2.

FIG. 6 shows a layout 90 for call templates formed by call template builder 50 (FIG. 2) by copying code fragments 84 (FIG. 2) into call template buffer 86 (FIG. 2). Call template layout 90 includes the following code fragments: a prolog fragment 91, a number (equal to the number of arguments of the function) of argument fragments 92–94, a call fragment 95, a return value fragment 96 (if the function has a return value), and an epilog fragment 97.

The prolog, epilog and function call fragments 91, 95, and 97 are always copied by call template builder 50 into each template that it forms. Prolog fragment 91 includes computer code to set up a frame of the function called by the template, and initializes pointers to the source and destination of the call. Call fragment 95 includes computer code to transfer control to the target function. Epilog fragment 92 includes code to cleanup the frame (free memory, etc.), and return control to the calling program.

The argument and return value fragments 92–94, 96, on the other hand, are copied as needed for particular function arguments and return values. Argument fragments 92–94 move a particular argument of the function from locations according to the source calling convention to locations determined according to the target calling convention. Return value fragment 96 moves a return value of the function from a location according to the target calling convention to the location required by the source calling convention.

Referring now to FIGS. 2 and 6, call template builder 50 determines which fragments to copy into template buffer 86, and which memory and register location references to patch into the fragments through use of the calling convention state machine represented in state information record 82 and calling convention descriptions 70–71. With state information record 82, call template builder 50 keeps track of what resources (e.g. processor registers 34 (FIG. 1), memory 38 (FIG. 1), etc.) have yet been used in the call template currently being built. For example, during template building, for each argument, the information in state information record 82 determines what is done with that parameter. As each argument is processed, state information record 82 is updated to reflect that action. Call template builder 50 also maintains other information in state information record 82, such as pointers to where fixups in the template are needed (as indicated in Table 3 above).

For example, when building call template 54 (FIG. 3) for function test 57 (FIG. 3) which has two arguments with data types integer and long, call template builder 50 first copies epilog fragment 91 (FIG. 6) to call template buffer 86 (FIG.

2). Call template builder 50 next copies fragments 92–93 for the function's two arguments. For the first argument, which is an integer data type in this example, call template builder selects the code fragment VsToRegI2 shown in Table 4 above and copies it into template buffer 86 as the first argument ($Arg_1$) fragment 92. This code fragment copies a 16-bit value from virtual stack 64 (where application program 56 (FIG. 3) passes arguments for a function call in conformance with the source calling convention) to a register (where the target calling convention expects its first argument). The code fragment when copied to the buffer is as follows (expressed in assembly language):

```
lh v0, 0 (s0)
```

Call template buffer 50 then patches the appropriate references to the locations for the first argument according to the source and target calling conventions. In accordance with the source calling convention, the first argument is at the top of virtual stack (i.e. at offset 0). Assuming the target calling convention is the MIPS calling convention discussed above, the target calling convention then requires the first argument to be in MIPS register R4. These locations are indicated by the information in state information record 82. Based on this information contained in state information record 82, call template builder 50 patches two fields, VsToRegI2.vsoffset and VsToRegI2.reg described above, in the code fragment with references to these locations so that the code fragment moves the first argument from offset 0 of the virtual stack to the MIPS register R4. After patching, the resulting $Arg_1$ fragment 92 is as follows (in assembly language):

```
lh r4, 0(s0) ; load half-word into R4 from
             ; location 0(s0)
```

Call template builder 50 then updates the information in state information record 82 to reflect which memory and register locations are required for the next argument of the function according to the source and target calling conventions.

For the second argument, which in this example is a long integer, call template builder 50 again selects an appropriate code fragment to copy into template buffer 86 as second argument ("$Arg_2$") fragment 83. Again, call template builder 50 determines based on function prototype 72 and calling convention descriptions 70–71 that a code fragment is needed which moves a long integer from the virtual stack to a MIPS register. The appropriate code fragment for this purpose is the "VsToRegI4" fragment. When copied to template buffer 86, this code fragment is as follows (in assembly language):

```
lw v0, 0(s0)
```

Based on the information in state information record 82, call template builder 50 then determines that the locations for the second argument according to the source and target calling convention are at offset −4 of virtual stack 64 and MIPS register R5, respectively. Call template builder 50 therefore patches references to these locations into $Arg_2$ fragment 93. After patching, the resulting $Arg_2$ fragment 92 is as follows (in assembly language):

```
lw r5, −4(s0) ; load word into R5 from
              ; location −4(s0)
```

After copying and patching argument fragments for the function's two arguments, call template builder 50 proceeds to copy the remaining fragments of the call template into template buffer 86 as needed. In this manner, the call template builder 50 copies and patches all the needed fragments to translate arguments, make the call, and translate the return value. Once this call template is created, it can be used every time the associated function call requires translation between the source and destination call conventions.

When complete, template buffer 86 contains a call template consisting of a linear code block. The instructions in the resulting template that move the functions arguments for translation between the source and target calling conventions are the two instructions as follows:

```
lh r4, 0(s0) ; translate first arg
lw r5, −4(s0) ; translate second arg
```

These linear code instructions of the call template directly move the function's arguments between the locations required by the two calling conventions without looping or further execution time processing of calling convention rules.

FIGS. 4A through 4D are a flow chart of a "BuildTemplate" process 100 utilized in call template builder 50 for building a call template from a function prototype according to the preferred embodiment. FIGS. 5A through 5I are flow charts showing various subprocesses employed in process 100. Names of each subprocess are shown in bold.

BuildTemplate process 100, which comprises steps 101–131, receives function prototype 72 (FIG. 2) as input, and produces a call template with layout 90 (FIG. 6). At a start 101 of process 100, call template builder 50 (FIG. 2) begins building the call template as indicated at step 102 by allocating space for call template buffer 86 out of memory 38 (FIG. 1) of the computer system on which call template builder 50 is run. As indicated at step 103, call template builder 50 then initializes state information record 82 using a subprocess "InitStateInfo" 220 (FIG. 5H) to indicate the locations according to source and destination calling convention definitions 70–71 for the first argument of the function.

Figure 5A:
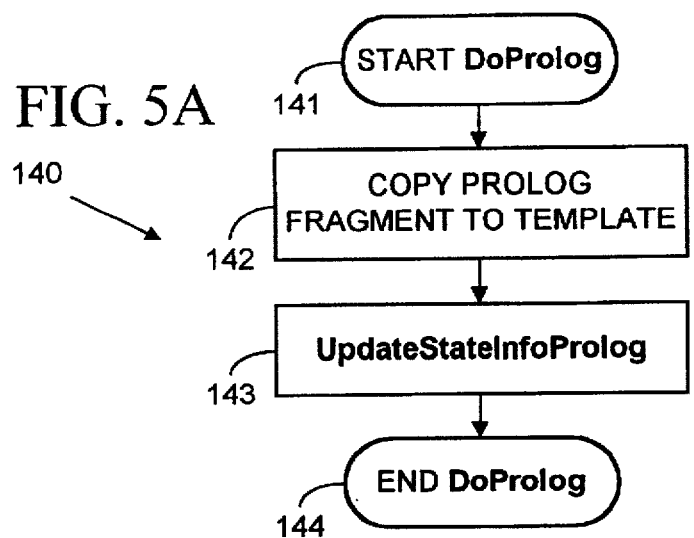
FIGS. 5A–5O are flow diagrams of sub-procedures of the call template building method of FIGS. 4A–4D.
Figure 5B:
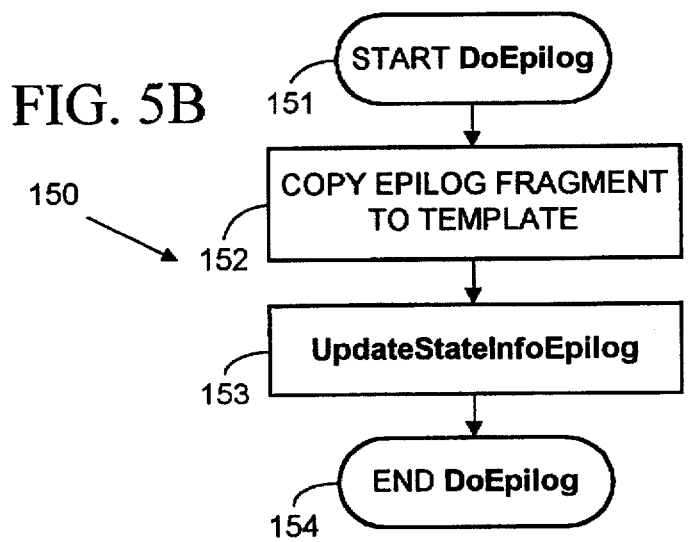
Figure 5C:
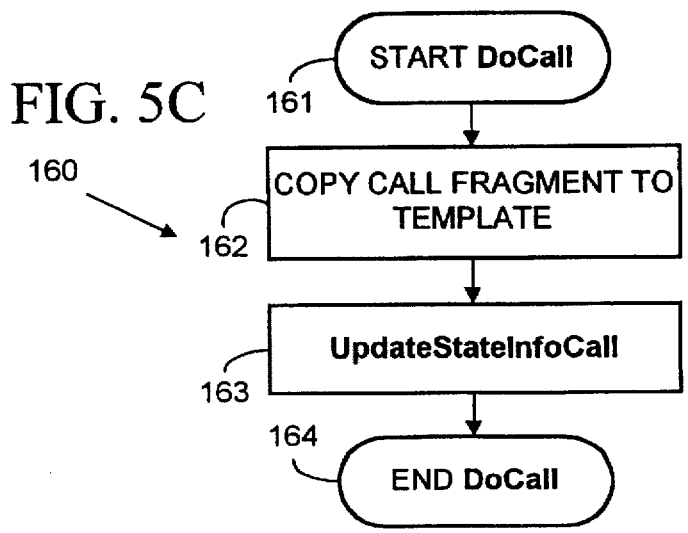
Figure 5D:
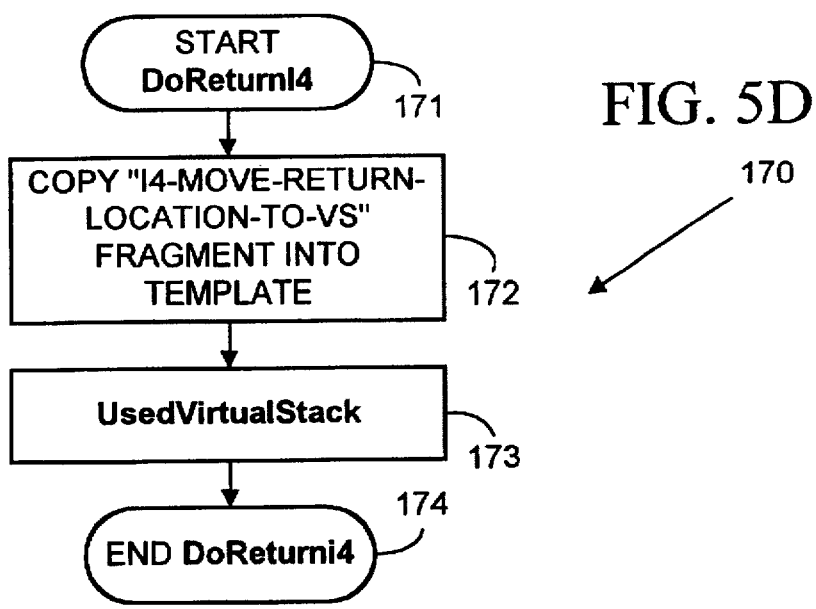
Figure 5E:
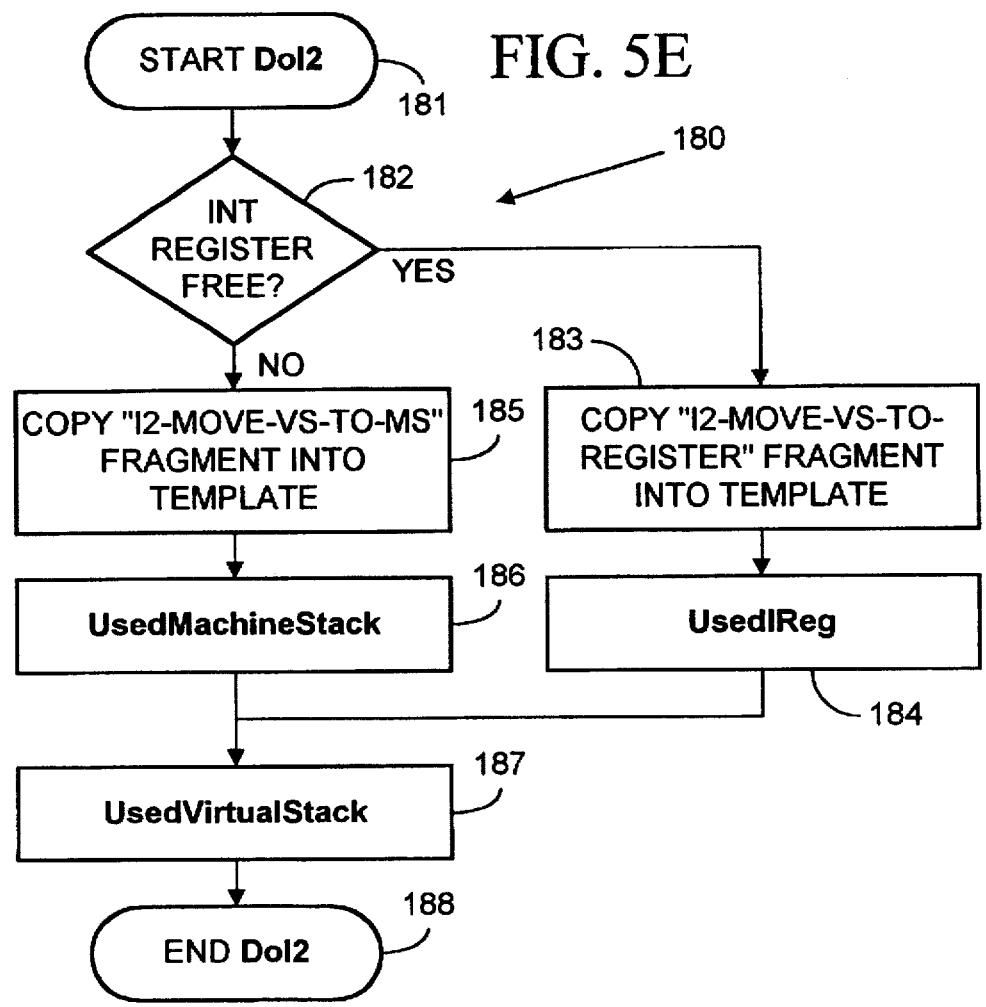
Figure 5F:
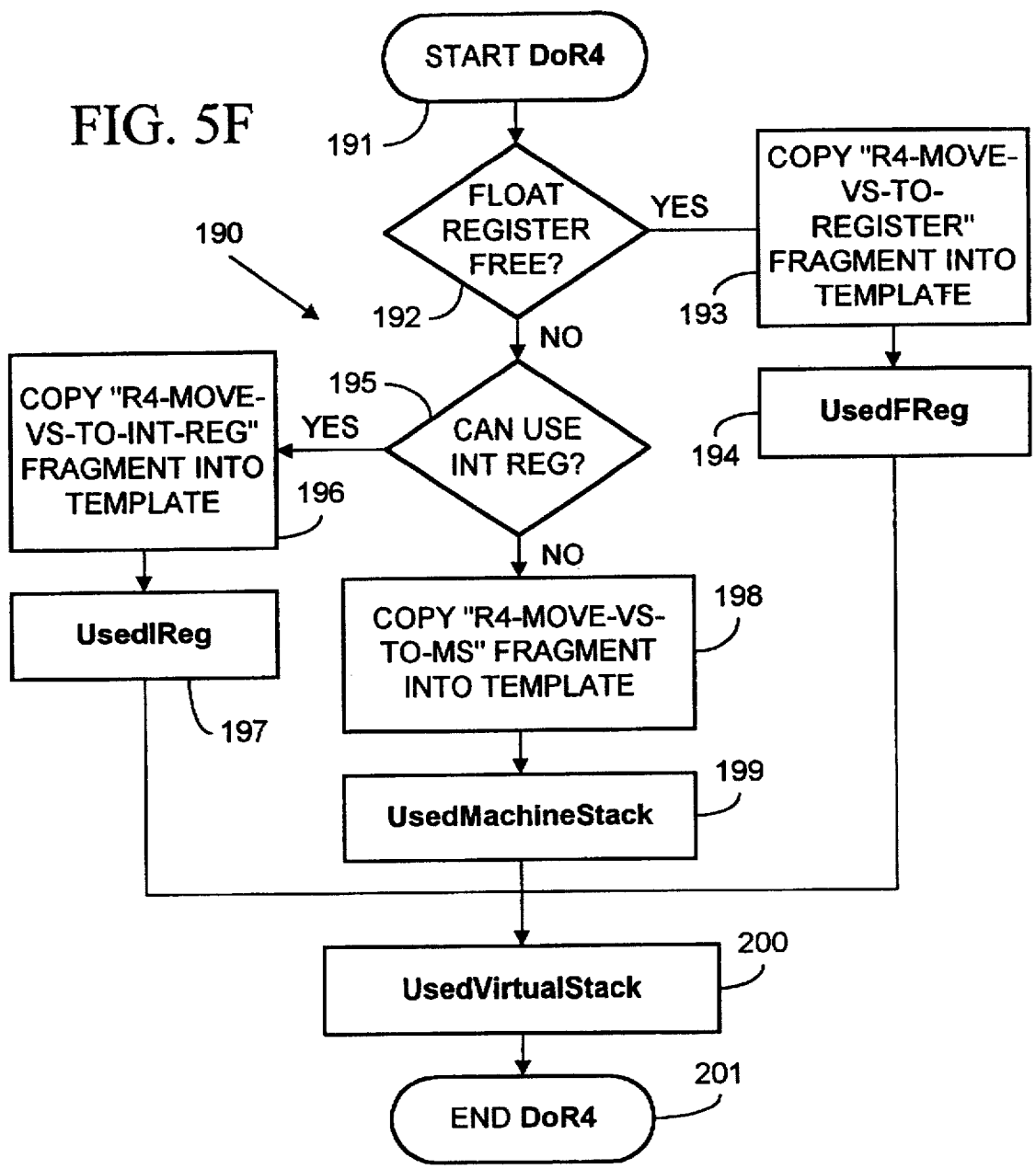
Figure 5G:
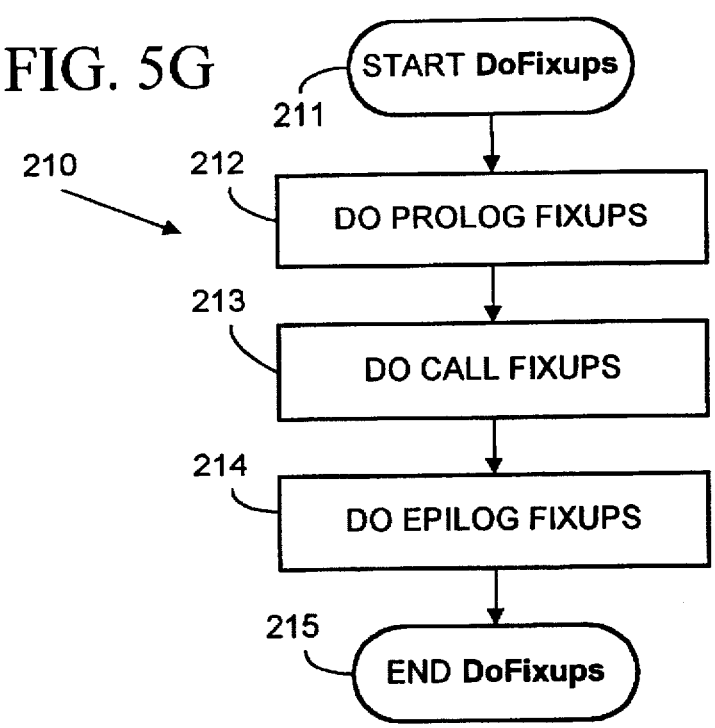
Figure 5H:
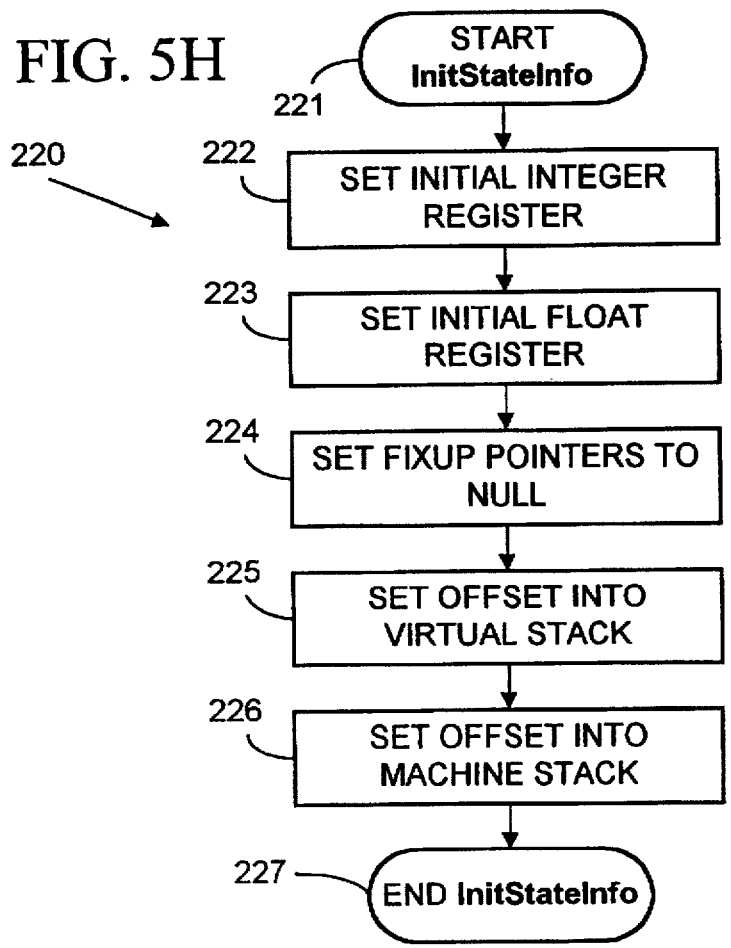

Referring to FIG. 5H, InitStateInfo subprocess 220 comprises steps 221–227. At steps 222–223, call template builder 50 sets values in state information record 82 to indicate the initial integer register and initial float register locations according to the target calling convention. At step 224, call template builder 50 sets fixup pointers to a null value. At steps 225–226, call template builder 50 sets values to indicate the initial offsets into virtual stack 64 and the machine stack according to the source and target calling conventions, respectively.

Figure 4A:
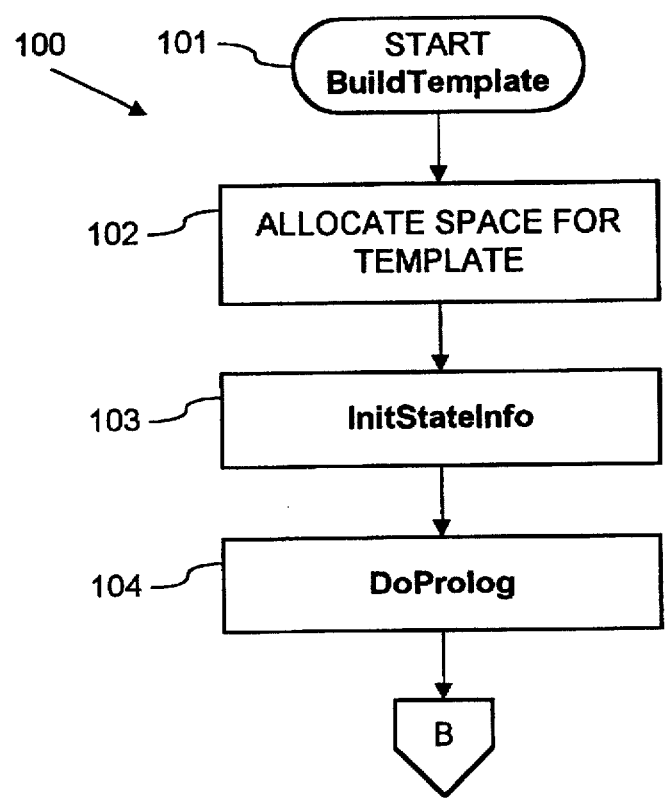
FIGS. 4A–4D are a flow diagram of a method performed by the call template builder of FIG. 2 to form a call template such as shown in FIG. 3.
Figure 5I:
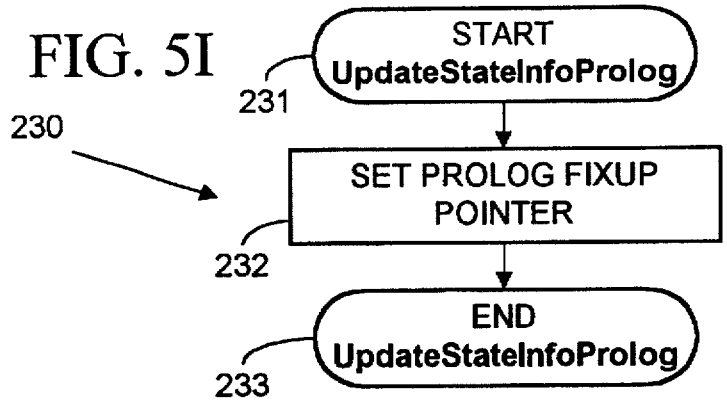

Referring now to FIGS. 4A, 5A, and 5I, at a next step 104 of BuildTemplate process 100, call template builder 50 begins copying code fragments 84 to call template buffer, starting with prolog fragment 91 (FIG. 6). To form prolog fragment 91, BuildTemplate process 100 employs subprocesses "DoProlog" 140 (FIG. 5A) which comprises steps 141–144, and "UpdateStateInfoProlog" 230 (FIG. 5I) which Comprises steps 231–233. At step 142 in DoProlog subprocess 140, call template builder 50 copies prolog fragment 91 into call template buffer 86. At step 232 in UpdateStateInfoProlog subprocess 230, call template builder 50 sets the prolog fixup pointer of state information record 82 (shown in Table 3 above).

Figure 4B:
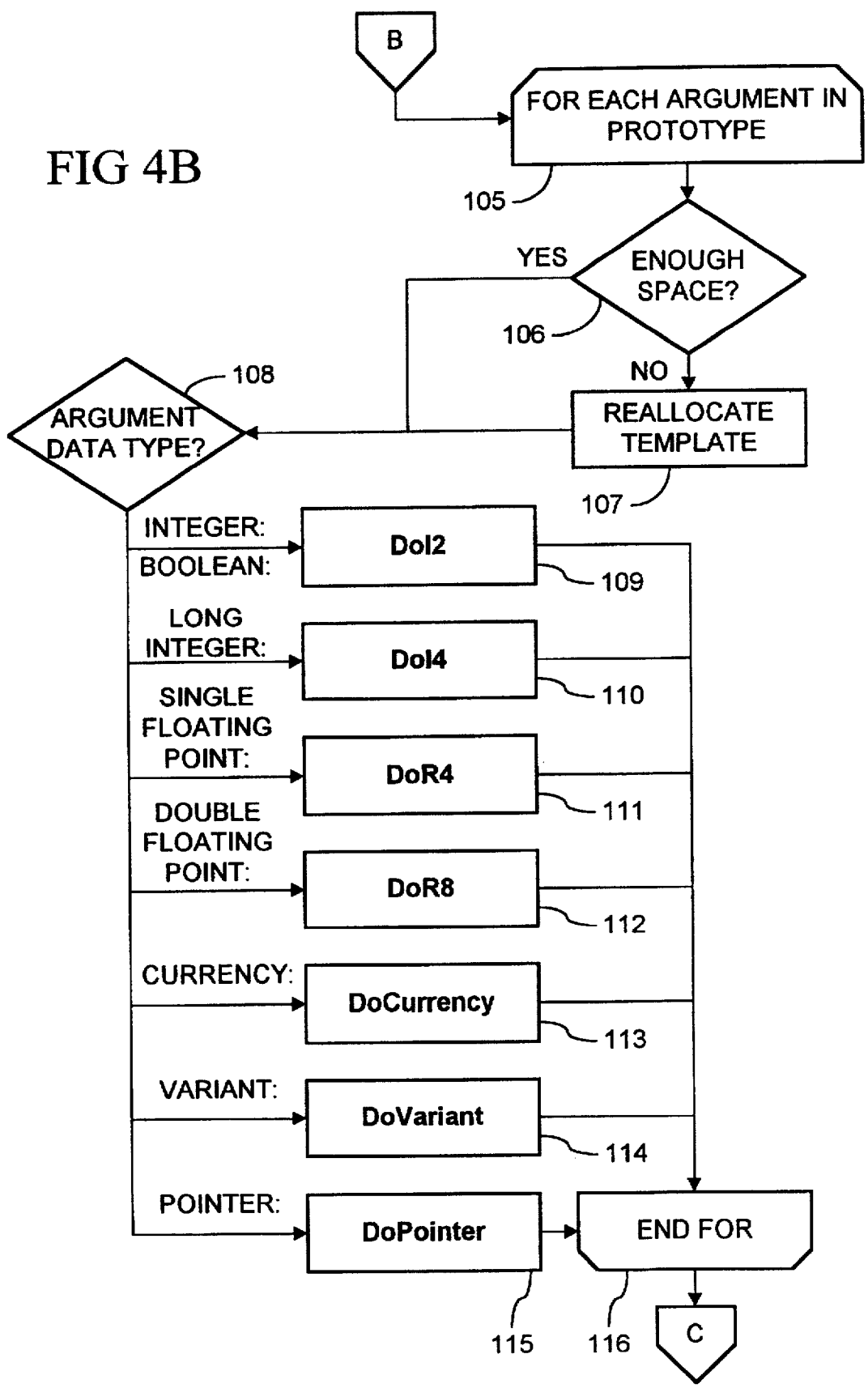

Referring now to FIG. 4B, in steps 105–116 of BuildTemplate process 100, call template builder 50 then loops through the arguments of the function as specified in function prototype 72 to form argument fragments 92–94 of the call template. At steps 106–107, call template builder 50 reallocates space in memory 38 (FIG. 1) for call template buffer 86 (FIG. 2) as necessary to accommodate argument fragments 92–94. As shown in steps 108–115, call template builder 50 then generates the argument fragment for each argument based on the argument's data type, by selecting an appropriate code fragment from collection 84 (FIG. 2). Call template builder 50 then repeats the loop at step 116 for the next argument specified in function prototype 72.

FIGS. 5E and 5F show subprocess "DoI2" 180 comprising steps 181–188, and "DoR4" 190 comprising steps 191–201 which are employed at steps 109 and 111 of the "for" loop 105–116 in process 100 (FIG. 4B). DoI2 subprocess 180 forms an argument fragment for arguments with integer and Boolean data types. DoR4 subprocess 190 forms an argument fragment for arguments that have the single floating point data type. Subprocesses (not shown) for other argument data types are similar.

Referring now to FIG. 5E, in DoI2 subprocess 180, call template builder 50 first determines at step 182 based on target calling convention definition 71, and state information record 82, whether any integer registers remain free to be allocated for passing the integer argument. If an integer register is free, call template builder 50 selects a code fragment in collection 84 for moving an integer from the virtual stack to an integer register, and copies the code fragment into template buffer 86 as indicated at step 183. If, however, all integer registers are already in use for passing previous arguments, call template buffer selects a code fragment from collection 84 for moving an integer from the virtual stack to the machine stack, and copies the code fragment into template buffer 86 as indicated at step 185. At steps 183 and 185, call template builder 50 further patches memory locations into the copied argument fragment corresponding to the offsets and registers indicated for the next argument in state information record 82 as explained above. At steps 184, 186–187, call template builder 50 then updates state information record 82 to reflect the allocation in steps 183 or 185 of register or stack locations to passing of the argument.

With reference to FIG. 5F, call template builder performs similar steps in DoR4 subprocess 190 to form an argument fragment (e.g., fragments 92–94 (FIG. 6)) for arguments having the floating point data type. At step 192, call template builder 50 determines based on target calling convention definition 71, and state information record 82, whether any floating point registers remain free to be allocated for passing the float argument. If a floating point register is free, call template builder 50 selects a code fragment in collection 84 for moving a 4-byte floating point value from the virtual stack to a floating point register, and copies the code fragment into template buffer 86 as indicated at step 193. If no floating point register is free, call template builder 50 then determines at step 185 based on target calling convention definition 71 and state information record 82, whether any free integer register can be used for passing the float argument. If an integer register can be used, call template builder selects a code fragment in collection 84 for moving a 4-byte floating point value from the virtual stack to an integer register, and copies the code fragment into template buffer 86 as indicated at step 196. If, however, no registers are available for use, call template buffer 50 selects a code fragment from collection 84 for moving the floating point argument from the virtual stack to the machine stack, and copies the code fragment into template buffer 86 as indicated at step 198. At steps 193, 196, and 198, call template builder 50 further patches memory locations into the copied argument fragment corresponding to the appropriate stack offsets and registers indicated for the next argument in state information record 82 as explained above. At steps 194, 197, and 199, call template builder 50 then updates state information record 82 to reflect the allocation in steps 183 or 185 of register or stack locations to passing of the floating point argument.

With reference now to FIGS. 5L through 5O, call template builder 50 employs subprocesses "UsedMachineStack" 260 (FIG. 5L) comprising steps 261–264, "UsedVirtualStack" 270 (FIG. 5M) comprising steps 271–274, "UsedIReg" 280 (FIG. 5N) comprising steps 281–285, and "UsedFReg" 290 (FIG. 5O) comprising steps 291–295 to update state information record to reflect the use of resources by the code fragment formed by DoI2 and DoR4 subprocesses 180, 190. After the update, state information record 82 correctly reflects the next register and memory locations to be used by call template builder 50 for the next argument whose code fragment is to be formed in for loop 105–116 (FIG. 4B).

Figure 5J:
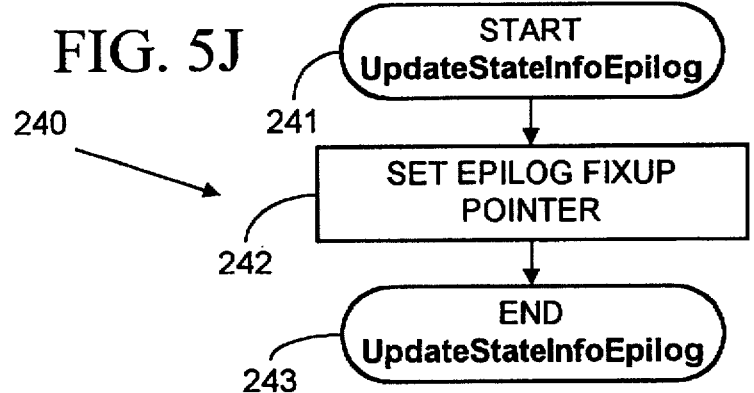
Figure 5K:
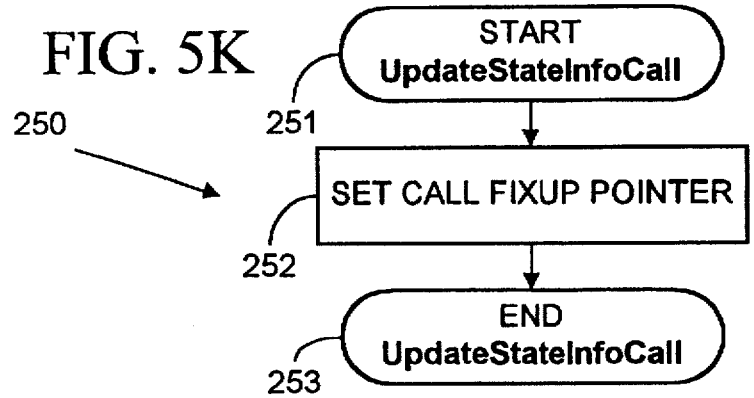
Figure 5L:
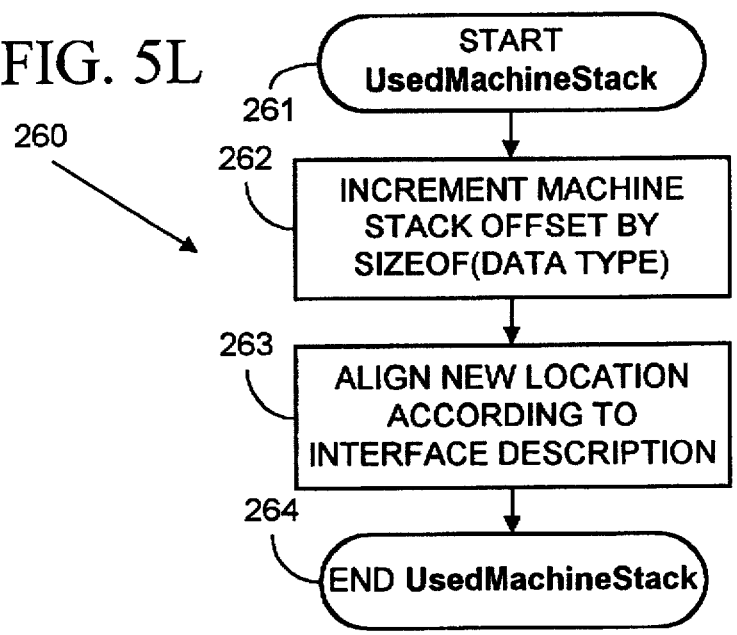
Figure 5M:
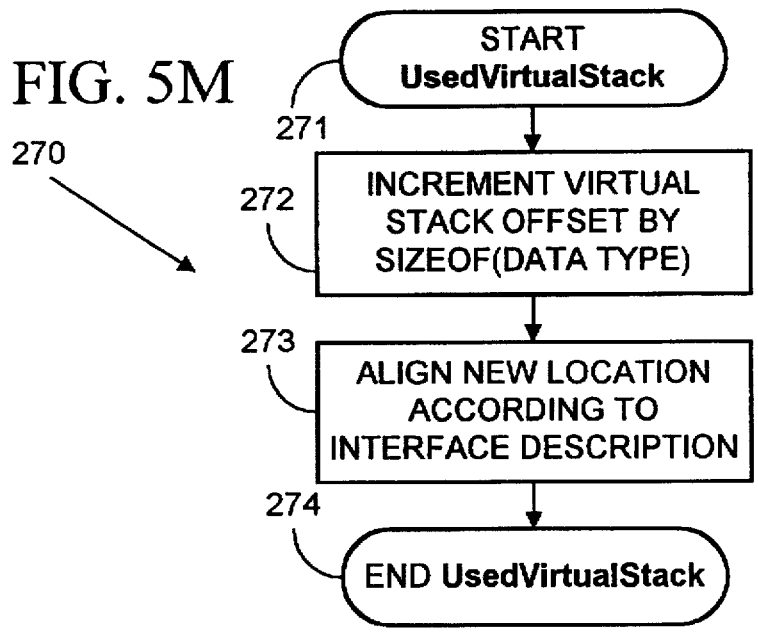

With reference to FIGS. 5L and 5M, in UsedMachineStack subprocess 260 at step 262, call template builder 50 increments the machine stack offset by the size of the argument's data type (i.e. 2 bytes for the integer argument processed by DoI2 180, 4 bytes for the single precision floating point argument processed by DoR4 190, etc.). At step 263, call template builder 50 further aligns the offset to reflect a requirement (if any) of the target calling convention that arguments must be aligned to particular interval boundaries (i.e., boundaries at fixed sized intervals, such as every 4- or 8-bytes) in memory. Similarly, in UsedVirtualStack subprocess 260 at steps 272 and 273, call template builder increments and aligns the offset for the virtual stack to reflect use of that resource in passing the an argument by the last copied argument fragment.

Figure 5N:
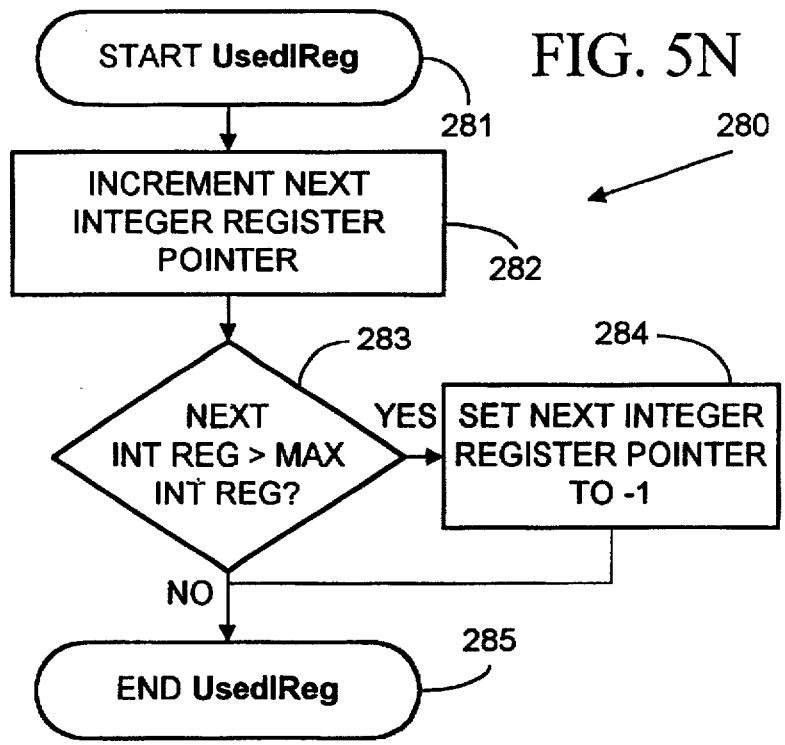
Figure 5O:
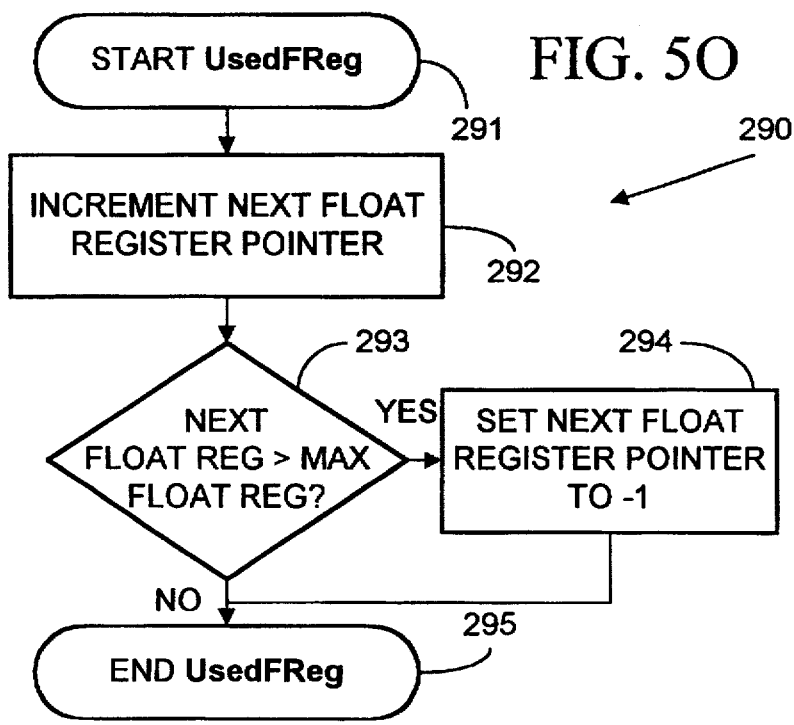

With reference to FIGS. 5N and 5O, in UsedIReg subprocess 280 at step 282, call template builder 50 increments the next integer register pointer in state information record 82 to reflect its use in passing an argument by the last copied argument fragment. At step 283, call template builder 50 then compares the value of the next integer register pointer to the maximum integer register constant defined in the target calling convention definition 71 to determine whether all integer registers used in the target calling convention for passing of arguments are now allocated. If the next integer register pointer exceeds this maximum integer register constant's value, the next integer register pointer is set to −1 at step 284 to indicate that all integer registers have now been allocated. In UsedFReg subprocess 290, call template builder 50 similarly increments the next floating point register pointer in state information record 82 at step 292, and sets the pointer to −1 in steps 293–294 if the maximum floating point register constant's value has been exceeded.

Figure 4C:
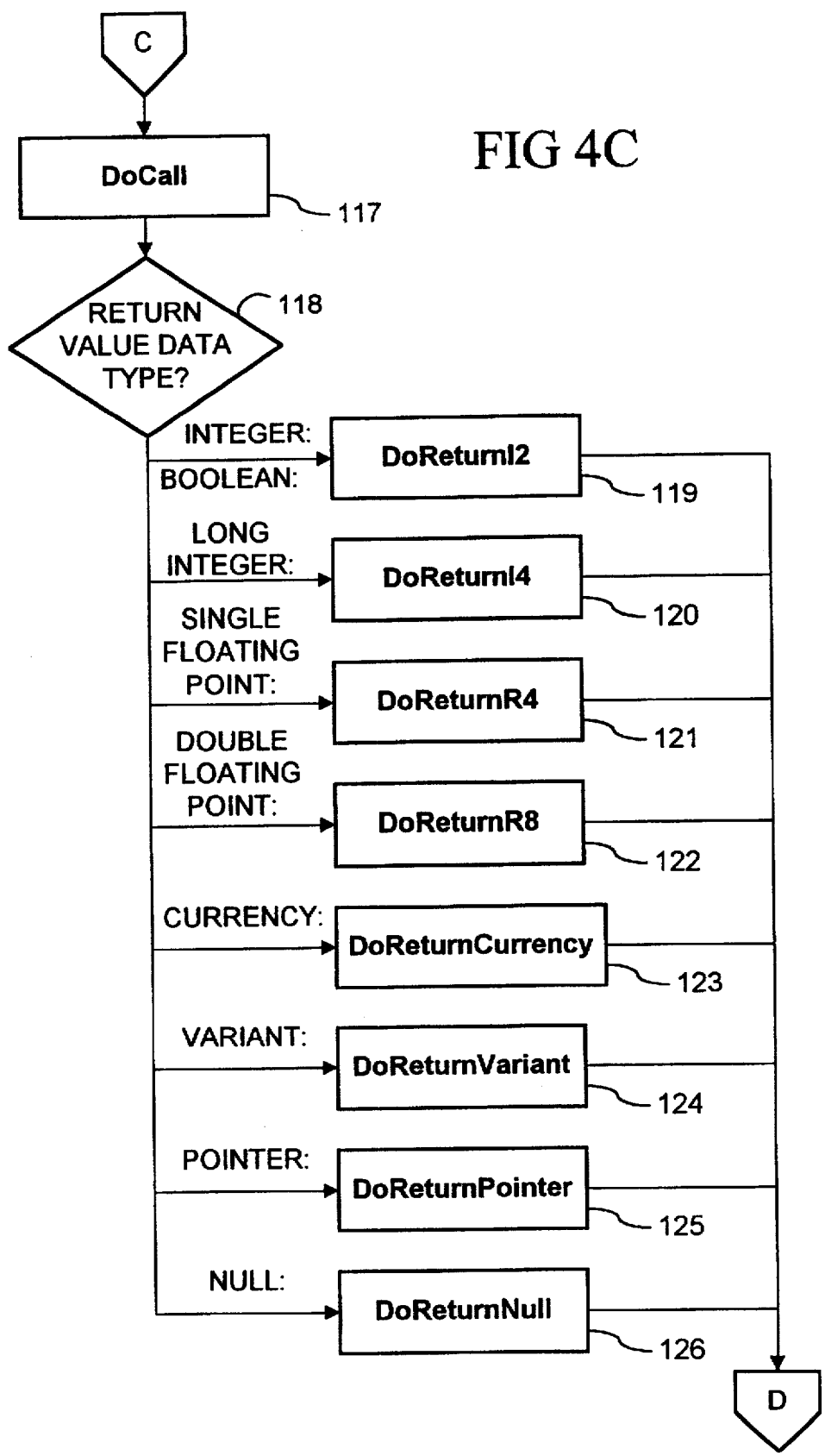

Turning now to FIG. 4C, after generating the argument fragments for each argument of the function prototype 72 (i.e. in for loop 105–116 of FIG. 4B), call template builder 50 at step 117 generates call code fragment 95 of the call template layout 90 (FIG. 6).

With reference to FIGS. 5C and 5K, call template builder 50 employs a subprocess "DoCall" 160 comprising steps 161–164, and a subprocess "UpdateStateInfoCall" 250 comprising steps 251–253 to generate call code fragment 95. In DoCall subprocess 160, call template builder 50 copies the call fragment from collection 84 into call template buffer 86 after any argument fragments 92–94 in call template layout 90. The call fragment is dependent on the target calling convention, but is the same for each call template generated for that target calling convention. At step 252 in UpdateStateInfoCall subprocess 250, call template builder 50 then sets the call fixup pointer in state information record 82.

Returning again to FIG. 4C, call template builder 50 next generates any return value fragment 96 (FIG. 6) for the call template. As shown in steps 118–126, call template builder 50 generates return value fragment 96 based on the return value's data type, by selecting an appropriate code fragment from collection 84 (FIG. 2), and patching appropriate memory or register location references according to the source and target calling conventions. The return value data type of a function with no return value is treated as a null data type as indicated at step 126.

FIG. 5D shows a subprocess "DoReturnI4" 170 comprising steps 171–174 which is employed by call template builder 50 at step 120 (FIG. 4C) to form a return value fragment 96 when the data type of the return value is a long integer. Subprocesses for other return value data types are similar. At step 172, call template builder 50 selects a code fragment from collection 84 for moving a long integer from the target calling convention's return location to that of the source calling convention (which in VBA's internal calling convention is virtual stack 64 (FIG. 7)). Call template builder 50 then updates state information record 82 with UsedVirtualStack subprocess 270 (FIG. 5M) described above.

Figure 4D:
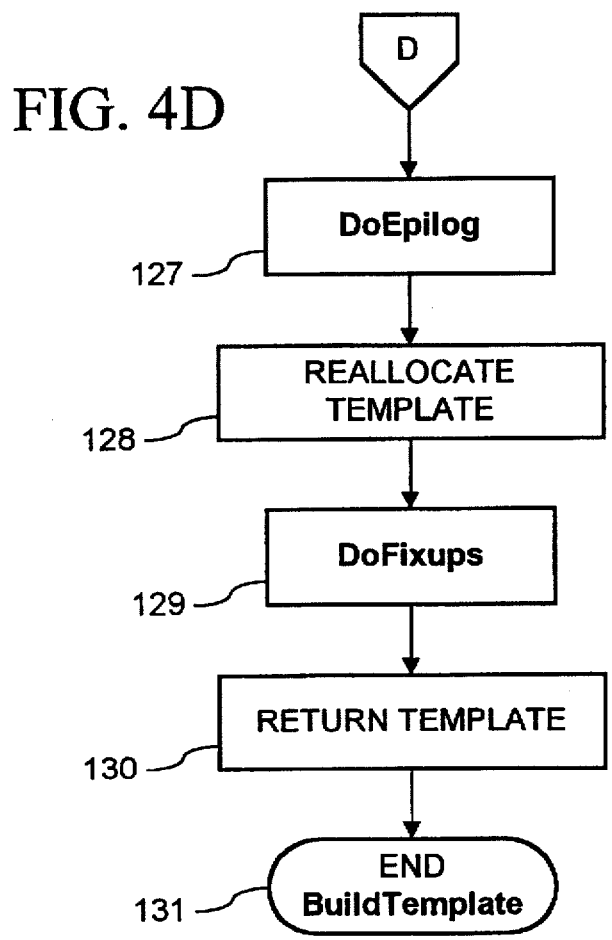

With reference now to FIGS. 4D, 5B, and 5J, call template builder 50 forms the final fragment, epilog fragment 97, of a call template layout 90 (FIG. 6) at step 127 (FIG. 4D), employing a subprocess "DoEpilog" 150 (FIG. 5B) comprising steps 151–154 and a subprocess "UpdateStateInfoEpilog" 240 (FIG. 5J) comprising steps 241–243. In DoEpilog subprocess at step 152, call template builder copies epilog fragment 97 from collection 84 into buffer 86. At step 242 in UpdateStateInfoEpilog subprocess 240, call template builder 50 then sets an epilog fixup pointer in state information record 82.

With reference to FIGS. 4D and 5G, call template builder 50 at steps 128–129 in BuildTemplate process 100 completes building the call template. At step 128, call template builder 50 reallocates template buffer 86 to minimize its size. At step 129, call template builder 50 performs various final fix-ups of the code fragments in the call template which may be required to adapt the code fragments to the particular function being called. The fix-ups required vary with the particular calling conventions involved. Call template builder 50 employs a subprocess "DOFixups" 210 (FIG. 5G) comprising steps 211–215 to perform the fix-ups. At step 212 of DoFixups subprocess 210, call template builder 50 performs any fixups that are required by the target calling convention for prolog fragment 91 (FIG. 6). The prolog fragment fixups may include, for example, patching a value of the function's frame size into a computer code instruction of the prolog fragment which allocates storage for the function frame on the machine stack. At step 213, call template builder 50 performs any fixups that are required by the target calling convention for call fragment 95. The call fragment fixups may include, for example, patching the address of the target function into a computer code instruction of the call fragment for calling the function. Finally, at step 214, call template builder 50 performs any fixups that are required by the target calling convention for epilog fragment 97 (FIG. 6). The epilog fragment fixups may include, for example, patching the value of the function's frame size into a computer code instruction of the epilog fragment which frees storage for the function frame on the machine stack. In performing the fix-ups, call template builder 50 utilizes the fix-up pointers in state information record 82 which are set in UpdateStateInfoProlog, UpdateStateInfoEpilog, and UpdateStateInfoCall subprocedures 230 (FIG. 5I), 240 (FIG. 5J), and 250 (FIG. 5K).

Call template builder 50 completes BuildTemplate process 100 by outputting the call template which has been built in buffer 86, such as by returning the call template to a compiler or programming language system which originally provided the function prototype in a call to call template builder 50.

The call template produced according to BuildTemplate process 100 is linked to each of the client program and server program. A target address (or id) of the target function in the server program is passed into call template builder 50 as part of function prototype 72 (FIG. 2) as shown in Table 2. Call template builder 50 places this address (or id) of the target function into the call template as part of the call fragments fixups at step 213 of DoFixups subprocess 210 (FIG. 5G). Thus, the completed call template is explicitly associated with the target function in the server program (i.e., the target address is encoded in the finished template).

The call template is further linked to the client program. In the preferred embodiment, call template builder 50 constructs a call template at the request of a programming language system (e.g. VBA programming language system) which is compiling the client program. When the programming language system encounters a call to an external function in the client program (for example, because of a "Declare" statement in the client program's source code), it first obtains the address (or id) of the function. The programming language system then invokes call template builder 50 to create the call template. The value returned to by call template builder 50 to the programming language system is the address of this call template. The programming language system uses this address (that of the call template) for the client program's function call rather than the address of the actual target function. Consequently, it appears to the client program (and the programming language system) as if it is directly calling the target function, while the call is actually handled through the intermediary of the call template.

Having described and illustrated the principles of our invention with reference to a preferred embodiment, it will be recognized that the preferred embodiment can be modified in arrangement and detail without departing from such principles. For example, elements of the preferred embodiment shown in software may be implemented in hardware and vice versa.

Further, although the call template builder has been illustrated with an embodiment adapted to form call templates for translation between the VBA programming language system's internal calling convention and an external computer hardware platform calling convention, it should be readily apparent to one skilled in the art that the call template builder can be utilized to form call templates for translation between any arbitrary calling conventions. Call template can be formed in accordance with the invention for translation from an external hardware calling convention to an internal programming language system calling convention, for translation between two calling conventions of a computer hardware platform, and for translation between programming language system calling conventions, among others. For example, two calling conventions, referred to generally as a C calling convention (which utilizes a right to left ordering of arguments) and a PASCAL calling convention (which utilizes a left to right ordering of arguments), have evolved for the Intel 80×86 computer hardware platform. Call templates can be formed in accordance with the invention for translation between these C and PASCAL calling conventions of the Intel 80×86 computer hardware platform.

Additionally, the preferred embodiment of the invention has been illustrated as utilizing a plurality of interface constants to form a target calling convention description. In accordance with the principles of the invention, interface constants can be utilized in various embodiments of the invention to form any one or both of the source and target calling convention descriptions.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system, a builder of call templates for making function calls across calling conventions, the call template builder comprising:

a memory for storing information defining a source calling convention and a target calling convention, the calling conventions determining different selections out of a plurality of storage locations of the computer system in which any arguments and return values of functions are to be passed in calls to the functions; and a code generator for receiving a prototype of a function and for generating a call template to translate a call to the function from the source calling convention to the target calling convention, the function prototype determining any arguments and return value of the function, the call template consisting of a linear code block including code for moving said any arguments and said any return value of the function from said selection of storage locations according to the source calling convention to said selection of storage locations according to the target calling convention.

2. The call template builder of claim 1 wherein the information defining at least one of the source and target calling conventions comprises a plurality of constant values.

3. The call template builder of claim 1 comprising:

a memory for storing a plurality of computer code fragments for moving arguments and return values between the storage locations;

a template buffer; and the code generator being operative to copy selected ones of the computer code fragments into the template buffer according to the data types of said any arguments and said any return value of the function determined according to the function prototype, and to paste references to storage locations determined according to the source and target calling conventions into the copied code fragments to thereby assemble the linear code block which forms the call template in the template buffer.

4. The call template builder of claim 3 comprising:

a memory for storing a state information record;

the code generator being operative, when assembling the call template, to track with the state information record which storage locations according to the source and target calling conventions have been referenced in the call template, the code generator thereby being operative to determine the storage locations according to the source and target calling conventions for a next argument of the function.

5. The call template building of claim 1 wherein the source calling convention is an internal calling convention of a computer programming language system, and the target calling convention is a calling convention associated with a computer processing platform.

6. In a computer system having a memory, a processor, and processor registers, the memory and processor registers providing storage locations for passing arguments and return values of function calls, a call template builder for constructing call templates consisting of linear code blocks for calling convention translation, the call template builder comprising:

a plurality of interface constants for defining a source calling convention and a target calling convention, the source and target calling conventions determining different storage locations of the computer system in which any arguments and return values of function calls are to be placed when making the function calls;

a function prototype record containing information defining a given function call including at least a number and data types of any arguments and data type of any return value;

a plurality of fragments of code including at least code fragments for moving various data types between storage locations of the computer system;

a template buffer;

a state information record containing data indicative of next storage locations for storing arguments of the given function call according to the source and target calling conventions;

a template generator for building a call template in the template buffer for translating the given function call from the source calling convention to the target calling convention;

for each argument of the given function call, the template generator being operative to select a code fragment for moving the data type of the argument between storage locations, to copy the selected code fragment into the template buffer based on the data types of the function prototype, and to patch references to storage locations into the selected code fragments based on the state information record and interface constants, to thereby form the call template.

7. A method in a computer system of interfacing between two blocks of code having different calling conventions, the method comprising:

compiling a first of the code blocks to call a function in a second of the code blocks according to a source calling convention;

compiling the function in the second code block to be called according to a target calling convention;

building a call template consisting of a linear block of code operative to translate a call to the function in compliance with the source calling convention into a call to the function which complies with the target calling convention; and linking the call template with the first and second code blocks whereby the first code block calls the function in the second code block through the call template.

8. The method of claim 7 wherein the step of compiling of the first code block comprises forming a function prototype containing information relating to a number and data types of any arguments and a data type of any return value of the function, the method further comprising:
- assembling an argument fragment in the call template for each argument of the function based on the function prototype, each argument fragment moving data of the respective argument's data type from a first location for the respective argument according to the source calling convention to a second location for the respective argument according to the target calling convention, the first and second locations for the respective argument being in memory or registers of the computer system;
- assembling a return value fragment in the call template for any return value of the function based on the function prototype, the return value fragment moving data of the return value's data type from a first location for the return value according to the target calling convention to a second location for the return value according to the source calling convention, the first and second locations for the return value being in memory or registers of the computer system.

9. The method of claim 8 comprising:
- assembling a call fragment in the call template for transferring processing control to the function.

10. The method of claim 9 comprising:
- assembling a prolog fragment in the call template for setting up a frame of the function, and for initializing pointers to the function in the second code block and to the function call in the first code block; and
- assembling an epilog fragment in the call template for cleanup of the frame.

11. The method of claim 8 comprising:
- representing each of the source and target calling conventions with a source calling convention description and a target calling convention description, respectively, each of the descriptions comprising a plurality of interface constants which are indicative of locations in memory or registers of the computer system for passing of arguments according to the respective calling conventions; and
- storing values in a state information record indicative of a next one of the locations in which arguments are to be passed according to each of the calling conventions.

12. The method of claim 11 comprising:
- initializing the state information record to indicate initial locations for passing of a first argument according to the source and target calling conventions;
- for each argument of the function,
  - copying an argument fragment into the call template for moving a data type of the argument;
  - patching the argument fragment with references to locations for passing the argument according to the source and target calling convention based on the state information record; and
  - updating the state information record to indicate next locations for passing of an argument according to the source and target calling conventions.

13. A method in a computer system of building a call template for calling convention translation of a function call based on descriptions of a source and a target calling conventions, and based on a function prototype containing information relating to a number and data types of any arguments and to a data type of any return value of a function, the call template consisting of a linear block of code, the method comprising:
- initializing a state information record to indicate initial locations for passing of a first argument according to the source and target calling convention descriptions;
- for each argument of the function,
  - copying an argument fragment into the call template for moving a data type of the argument;
  - patching the argument fragment with references to locations for passing the argument according to the source and target calling convention descriptions based on the state information record; and
  - updating the state information record to indicate next locations for passing of an argument according to the source and target calling convention descriptions;
- thereby forming the call template as a linear block of code with a computer system code for moving each argument of the function call between locations required by the source and target calling conventions.

14. A computer-readable medium having computer-executable instructions for performing the steps recited in claim 7.

15. A computer-readable medium having computer-executable instructions for performing the steps recited in claim 13.

* * * * *